United States Patent [19]

Browne et al.

[11] 4,276,169
[45] Jun. 30, 1981

[54] DRAINAGE DECK ASSEMBLY FOR ROTARY VACUUM DRUM FILTER

[75] Inventors: Paul A. Browne; Robert W. Morton, both of Orillia, Canada

[73] Assignee: Dorr-Oliver Incorporated, Stamford, Conn.

[21] Appl. No.: 139,009

[22] Filed: Apr. 10, 1980

[51] Int. Cl.³ .............................................. B01D 33/06
[52] U.S. Cl. ..................................... 210/404; 210/406
[58] Field of Search ............... 68/181 R; 162/60, 357, 162/380; 210/77, 217, 402, 404, 406, 232, 234

[56] References Cited

U.S. PATENT DOCUMENTS

| | | | |
|---|---|---|---|
| 2,027,652 | 1/1936 | Raisch | 210/404 |
| 2,724,507 | 11/1955 | Cataldo | 210/404 |
| 3,096,279 | 7/1963 | Komline | 210/404 |
| 3,175,691 | 3/1965 | Watson | 210/404 |
| 3,225,935 | 12/1965 | Porteous | 210/404 |
| 3,363,774 | 1/1968 | Luthi | 210/406 |
| 3,680,708 | 8/1972 | Luthi | 210/404 |
| 3,775,234 | 11/1973 | Rich | 162/357 |
| 3,794,178 | 2/1974 | Luthi | 210/404 |
| 3,837,499 | 9/1974 | Luthi | 210/404 |

Primary Examiner—Ernest G. Therkorn
Attorney, Agent, or Firm—Burtsell J. Kearns; Harold M. Snyder

[57] ABSTRACT

A drainage deck assembly for a rotary vacuum drum filter having filtrate compartments on the outer surface of the drum comprised of premolded interlocked grid sections formed with integral baffle walls for directing the flow of filtrate outwardly of the filtrate compartments and which grid sections are provided with rows of filtrate receptacle trays in the surface thereof having bottom walls formed with filtrate discharge slots located at a position to prevent return flow of filtrate to the receptacle.

8 Claims, 7 Drawing Figures

DRAINAGE DECK ASSEMBLY FOR ROTARY VACUUM DRUM FILTER

BACKGROUND OF THE INVENTION

The present invention is directed to new and useful improvements in rotary vacuum drum filters and more particularly to the drainage deck assemblies for such filters.

Rotary vacuum drum filters are well known and are used for example in the pulp and paper industry to filter and wash pulp slurries. These filters generally comprise a cylindrical drum mounted for rotation in a tank containing a slurry solution. A filter media such as a cloth or other permeable material is provided about the drum and is spaced from the drum surface by an appropriate drainage deck assembly mounted on the outer surface of the drum. As the drum is rotated through a filtration cycle a vacuum is maintained inside the drum whereby a filter cake is formed on the surface of the filter media as the drum ascends from the tank while filtrate is drawn into filtrate compartments by the vacuum.

The filter cake is removed from the surface of the filter media by suitable doctoring means as the drum descends into the tank and the vacuum is interrupted by appropriate valve means. The drainage deck functions to space the filter media from the drum surface and usually includes means to direct the filtrate from the filtrate compartments outwardly of the filter through drainage pipes interconnected to the filtrate compartments and the valve means.

In the past many devices have been utilized to form the drainage deck assembly and although suitable for their intended purposes various problems have been encountered in the use thereof. In particular problems are present in providing effective and economical means to prevent rewetting of the dry filter cake from a runback of the filtrate to the cake as the drum rotates through the descending path of the filtration cycle when the vacuum to the filtrate compartments is interrupted.

Prior art vacuum drum rotary filters of the type discussed which disclose structures for both spacing the filter media from the drum surface and for controlling flow of the filtrate are typified by but not limited to U.S. Pat. Nos. 2,793,755; 3,175,691; 3,794,178; 3,837,499 and 3,954,622.

In U.S. Pat. No. 2,793,755 the deck comprises removable pan assemblies and in U.S. Pat. No. 3,794,178 the deck is comprised of premolded elongated plastic members. In U.S. Pat. No. 3,837,499 perforated corrugated plates are used to space the filter media from the drum surface. Other typical drainage assemblies utilizing grid sections are disclosed in U.S. Pat. Nos. 3,175,691 and 3,954,622 wherein spaced and parallel divider elements extend longitudinally across the surface of the drum to form filtrate compartments therebetween. The preformed drainage grid sectors are located in rows between these spaced dividers to complete the filtrate compartment and are held in place by clamping flanges of the divider element.

It is an object of the present invention to provide a novel drainage deck assembly for a rotary vacuum drum filter.

It is a further object to provide a novel drainage deck assembly comprising a plurality of interconnected premolded sections to form a continuous drainage deck and supporting surface for the filter media.

Another object is to provide a drainage deck structure having both novel integral fluid directing means and means for preventing the flowback of filtrate.

A still further object is to provide a novel drainage deck assembly comprised of a plurality of interconnected premolded drainage sections which provide a lightweight assembly of reduced manufacturing and labor costs.

SUMMARY OF THE INVENTION

The present invention contemplates a novel drainage deck assembly for a rotary vacuum drum filter. In one embodiment a plurality of elongated longitudinally extending divider members are located about the filter drum and spaced one from the other at predetermined intervals. A drainage deck assembly is provided which comprises premolded grid sections arranged in rows between each pair of spaced dividers and held in place thereby to provide filtrate drainage compartments. Each row of drainage grid sections is interconnected to the row of the next filtrate compartment in a manner to form a continuous uninterrupted surface for supporting a permeable filter cloth and spacing the latter from the outer surface of the drum. Each grid section includes means for gripping the filter cloth to deter movement thereof and with a plurality of rows of filtrate receptacle trays. The bottom walls of the receptacle trays are provided with slot openings for directing the fluid to the filtrate compartments but located to prevent return of fluid during the descending path of the filter drum. The grid sections are also provided with a plurality of depending longitudinal baffle walls to divide the filtrate compartment into a plurality of filtrate channels to direct the filtrate flow to the filter discharge.

The above and other objects and advantages of the present invention will appear more fully hereinafter from a consideration of the detailed description which follows taken together with the accompanying drawings wherein one embodiment of the invention is illustrated.

DETAILED DESCRIPTION

Figure 1:
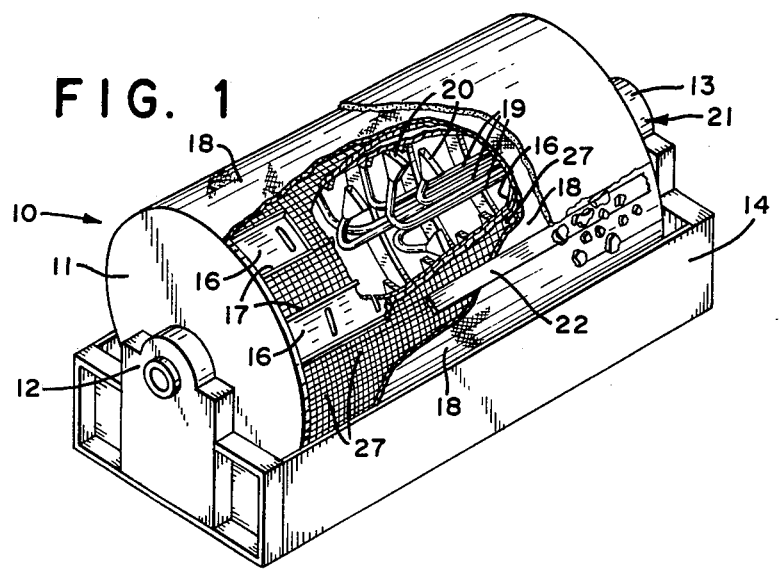
FIG. 1 is a perspective schematic illustration of a rotary drum vacuum filter incorporating one embodiment of the present invention with parts thereof broken away to disclose the interior thereof.
Figure 2:
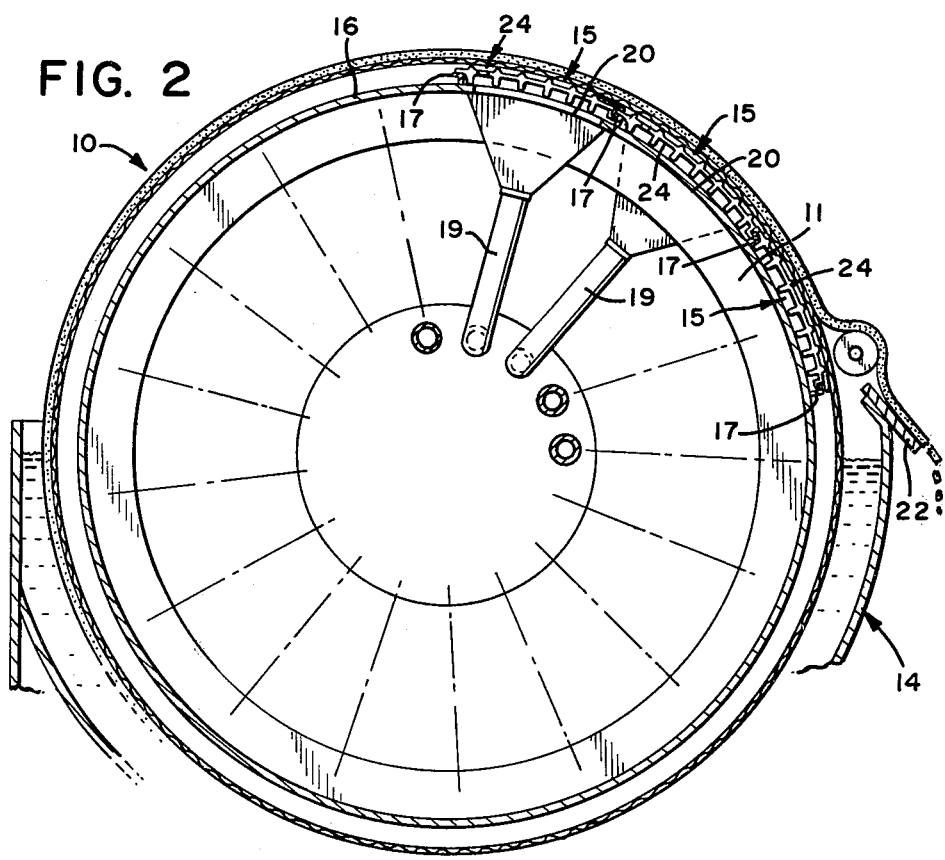
FIG. 2 is a fragmentary side elevational view partly in cross-section of the filter of FIG. 1.

Referring now to the drawings for a more detailed description of the present invention a rotary vacuum drum filter which comprises a pulp washer unit incorporating the embodiment of the present invention is generally indicated by the reference numeral 10 in FIGS. 1 and 2. Filter 10 includes a cylindrical drum assembly mounted in spaced trunnion devices 12-13 for rotation in a tank 14 containing a pulp slurry. Drum assembly 11 is provided with a plurality of filtrate compartments 15 about the outer wall surface 16 thereof.

Filtrate compartments 15 (FIG. 2) are located between pairs of longitudinally extending divider members 17 mounted at predetermined like spaced intervals in parallel relationship on the outer wall 16 of drum 11. A filter media such as a filter cloth 18 is provided about drum 12 and is spaced from outer wall 16 thereof by filtrate compartments 15. Drainage pipes 19 equal in number to the number of filtrate compartments 15 are located within drum 12 with each pipe 19 having a conical shaped opening 20 (FIG. 2) at one end thereof to a filter compartment 15. The opposite end of drainage pipes 18 extend to a valve assembly generally indicated by the reference numeral 21 in FIG. 1 located in trunnion 13 and through which valve assembly 21 the filtrate is discharged in a usual manner.

In operation of filter 10 a liquid pulp slurry is fed to tank 14 and drum 11 is rotated in direction of arrow A (FIG. 1). A vacuum is applied to the filtrate compartments 15 through pipes 19 to effect a suction through filter cloth 18 as drum 11 ascends from tank 14 whereby filter cake adheres to the surface of filter cloth 18. As drum 11 rotates in a descending path valve assembly 21 is operated in a well known manner to interrupt the vacuum in pipes 19 to permit removal of the dried filter cake from the filter cloth 18 by doctor blade device 22.

As mentioned it is a feature of the present invention to provide a novel drainage deck for drum 11 which is effective to space filter cloth 18 from outer wall surface 16 and for directing the filtrate to discharge openings 20 of drain pipes 19. To this end each filtrate compartment 15 is comprised of a plurality of laterally spaced and contiguous drainage sections 24.

Each drainage section 24 (FIG. 3) is rectangular shaped grid configuration and made of a hard premolded plastic material such as that sold under the registered trademark KYNAR ®. The top surface 25 of grid section 24 comprises a plurality of parallel rows 26 of recessed filtrate receptacles trays 27. The bottom wall surface 28 of each receptacle tray 27 is provided with a discharge slot opening 29 at the top or trailing end thereof with respect to the path of rotation of drum 11. The under surface of each grid section 24 is formed with a series of longitudinally extending baffle walls 30 adapted to be seated on outer wall 16 of filter drum 12. Although drainage sections 24 are formed from a hard and stiff plastic material they are axially flexible in the direction of baffles 30 to conform to the arcuate surface of drum 12. Sections 24 are held in place on drum 11 by the longitudinally extending dividers 17 which are each provided with an angled end portion 32.

Figure 3:
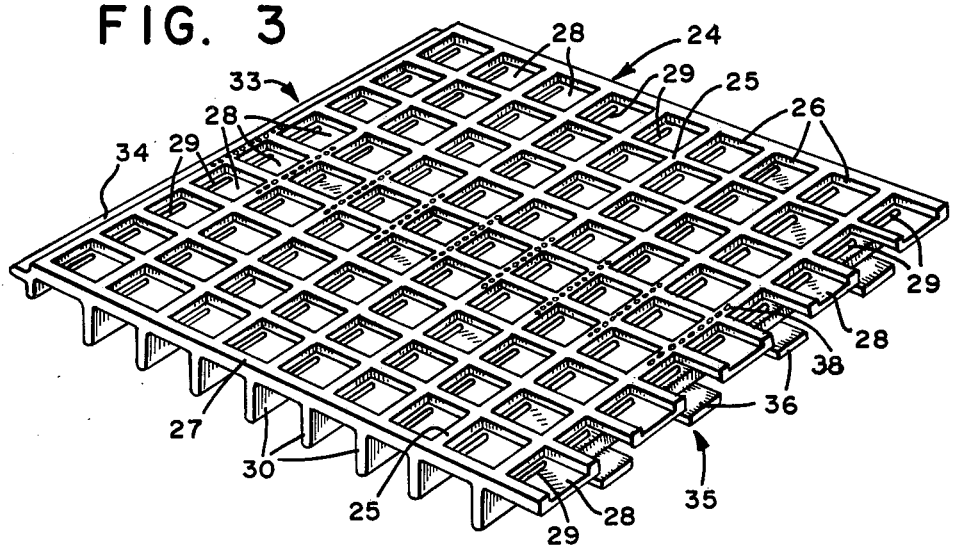
FIG. 3 is a perspective view of a drainage grid section.
Figure 4:
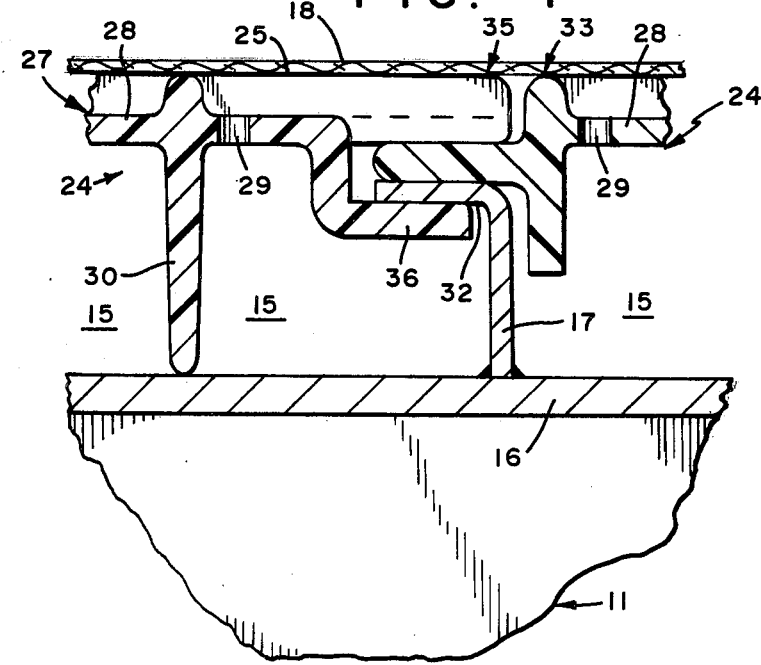
FIG. 4 is an enlarged sectional end view of two interlocked drainage sections.

As seen in FIGS. 3 and 4 the trailing end 33 of grid 24 (as defined with respect to the path of rotation of drum 11) is provided with a straight uninterrupted ledge portion 34 adapted to be seated on the upper surface of angled end 32 of an adjacent divider 17. The opposite or leading end 35 of each section 24 is formed with L-shaped teeth 36 which project from a rib member 37 which forms a portion of the bottom wall 28 of each alternate filtrate tray 27 in the first row of trays 27 are located at leading end 35. In mounted position of grid 24 teeth 36 are located in sliding engagement with the under surface of angled end 32 of divider 17. The bottom walls 28 of the filtrate receptacles trays 27 adjacent teeth 36 are fitted over ledge portion 34 of the sector 24 of the next adjacent filtrate compartment 15 and in cooperation with teeth 36 lock the grid section 24 in place on drum surface 11. The engagement of ledge 32 completes the bottom walls 28 and the configuration of the trays in the said first row.

Figure 5:
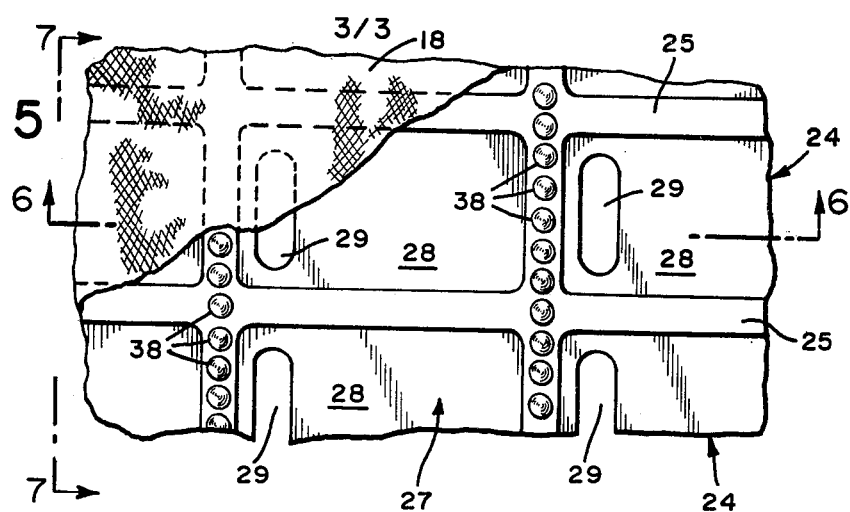
FIG. 5 is an enlarged plan view of a portion of the filter media and a drainage grid section.
Figure 7:
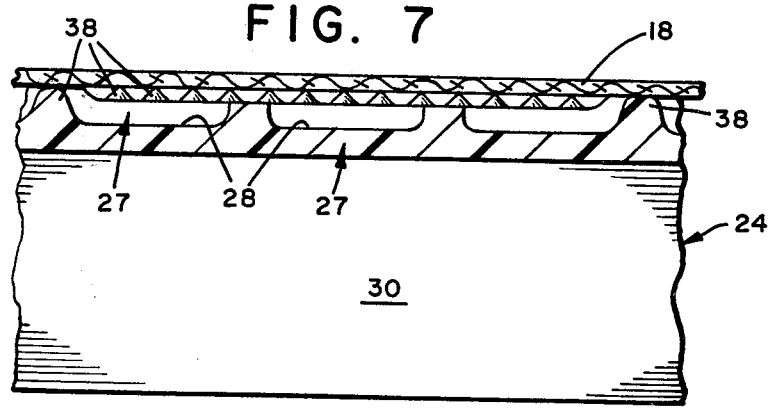
FIG. 7 is a sectional view taken on the line 7—7 of FIG. 6.

In addition a plurality of rows of nibs or dragon teeth projections 38 are formed on the top surface 25 of each grid 24. Nibs 38 (FIGS. 5 and 7) are adapted to grip the under surface of filter cloth 18 and prevent lateral movement thereof.

As seen in FIG. 1 each longitudinally extending filtrate compartment 15 of the illustrated filter 10 contains a number of grid sections 24 arranged in side by side contiguous relationship in accordance with the predetermined number of sections 24 as needed for filter 10. Drainage sections 24 are interlocked about the circumference of drum 11 in the manner previously described to provide a continuous uninterrupted drainage surface in contact with filter cloth 18 providing maximum uninterrupted filtration surface with a minimum of dead space.

Figure 6:
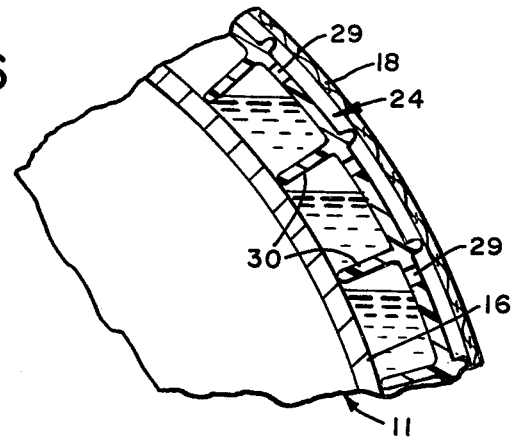
FIG. 6 is a sectional view taken on the line 6—6 of FIG. 5.

In operation of filter 10 when drum 11 is rotated in the direction of arrow "A" (FIG. 2), a vacuum is applied to filtrate compartments 15 to draw filtrate from the slurry into compartments 15 while filter cake adheres to and dries on the surface of filter cloth 18. Filtrate flows into receptacle trays 27 and thence through slots 29 to filtrate compartments 15. The filtrate is guided by parallel baffle walls 30 to the openings 20 of the drainage pipe 19 connected to the associated filtrate compartment 15. As the filtration cycle continues and drum 11 descends into tank 14 and the vacuum is interrupted any filtrate which has not been drained is trapped beneath walls 28 (FIG. 6) and is prevented from reentering filter receptacles 27 by wall 28 and the location of slot 29 at the upper end (FIG. 6) thereof.

It will be apparent from the foregoing description that the novel drainage deck assembly has many advantages in use. One advantage is that economical and integral means are provided in grid sections 24 for preventing rewetting of the filter cake during the filtration cycle. In addition the sections 24 are formed with integral baffle means for directing the flow of filtrate and for strengthening the grid structure itself. Further as a result of the novel interlocking means for sections 24 adjacent filtrate compartment 15 are interconnected to provide an uninterrupted filtration and drainage surface.

It is expressly understood that the present invention is not limited to the embodiment illustrated and described. Various changes can be made in the design and arrangement of parts without departing from the spirit and scope of the invention as the same will now be understood by those skilled in the art.

What is claimed is:

1. A drainage deck assembly for a rotary vacuum drum filter having a drum mounted for rotation in an ascending and descending path into and out of a slurry tank, said drainage deck assembly comprising:
   (a) a plurality of divider members extending longitudinally of the central axis of said drum and mounted in spaced and parallel relationship about the outer surface of said drum,
   (b) at least one rectangular shaped drainage grid section mounted between each pair of divider members to provide filtrate compartments therebetween about the circumference of said drum, (c) openings provided in the outer surface of said drum in each of said filtrate compartments for receiving filtrate for discharge from said filter,
(d) interlocking means on the trailing and leading ends of each grid section for securing said grid section to said pair of dividers,
(e) a filter media located about the drum and spaced from the outer surface thereof by said grid sections,
(f) a plurality of spaced and parallel rows of filtrate receptacle trays provided in the surface of each of said grid sections to receive filtrate from said filter media when a vacuum is applied to said drainage grid section in the ascending path of the drum,
(g) a plurality of baffle walls depending from each grid section to engage said drum surface and to provide a filtrate channel in said filtrate compartment leading to said discharge opening for each row of said plurality of rows of filtrate receptacles,
(h) said filtrate receptacle trays each having a bottom wall surface spaced from said filter media by the sidewalls of the tray, and
(i) a filtrate discharge slot formed in the bottom wall of each of said filtrate trays at a predetermined location at the end of said tray closest to the trailing end of the grid section to permit flow of filtrate into its associated filtrate channel in said filtrate compartment during the ascending path of said drum and to prevent flowback of filtrate through said slot when said vacuum is interrupted in the descending path of the drum.

2. The device of claim 1 wherein a plurality of longitudinally extending baffle walls depend from said grid section beneath and between the rows of filtrate receptacles to engage the outer surface of said drum and provide channels between each pair of said baffle walls to control flow of filtrate received from said discharge slots.

3. The device of claim 1 where projecting nibs are formed integrally on the surface of said grid section to engage and prevent lateral movement of said filter media.

4. The device of claim 1 wherein said divider members comprise elongated flanged members secured to said drum and wherein said interlocking means for said grid section comprise a plurality of teeth formed on one end of the grid adapted to engage and be detented by said flanged member.

5. The device of claim 4 wherein said teeth of said grid are formed by portions of the bottom wall of every other tray of the first axially row of filtrate receptacles of the grid.

6. The device of claim 4 wherein the last axially row of said grid section is provided with projecting elongated ledge portion seated on said flanged member and detented thereon by detenting portions of the grid section of the next filtrate compartment.

7. The device of claim 7 wherein said detenting portions of said other grid section comprise said teeth of said first row of filtrate receptacle trays and the bottom walls of the remaining trays of said first row of said other grid section.

8. The device of claim 7 wherein said interlocked ends of said adjacent ends of said pair of grid sections are configurated to complete the side walls of said filtrate receptacle trays of the toothed first row of said pair grid sections.

* * * * *